United States Patent
Kim et al.

(10) Patent No.: US 12,250,069 B2
(45) Date of Patent: Mar. 11, 2025

(54) APPARATUS AND METHOD FOR GENERATING JAMMING SIGNAL, COMMUNICATION SYSTEM

(71) Applicants: AGENCY FOR DEFENSE DEVELOPMENT, Daejeon (KR); Foundation of Soongsil University-Industry Cooperation, Seoul (KR)

(72) Inventors: Taehoon Kim, Daejeon (KR); Yoan Shin, Seoul (KR); Beong Sung Kim, Seoul (KR); Kwansoo Kim, Seoul (KR)

(73) Assignee: Agency for Defense Development, Daejeon (KR)

( * ) Notice: Subject to any disclaimer, the term of this patent is extended or adjusted under 35 U.S.C. 154(b) by 318 days.

(21) Appl. No.: 17/734,883

(22) Filed: May 2, 2022

(65) Prior Publication Data
US 2022/0353008 A1    Nov. 3, 2022

(30) Foreign Application Priority Data

May 3, 2021    (KR) .................. 10-2021-0057260

(51) Int. Cl.
*H04K 3/00*    (2006.01)
*H04K 1/04*    (2006.01)

(52) U.S. Cl.
CPC .............. *H04K 3/44* (2013.01); *H04K 3/42* (2013.01); *H04K 3/46* (2013.01)

(58) Field of Classification Search
None
See application file for complete search history.

(56) References Cited

U.S. PATENT DOCUMENTS

| 7,653,118 B1 * | 1/2010 | Whelan ............... H04B 1/69 375/139 |
| 9,344,125 B2 | 5/2016 | Kpodzo et al. |

(Continued)

FOREIGN PATENT DOCUMENTS

| EP | 3410621 A1 | 12/2018 |
| KR | 10-2149456 B1 | 8/2020 |

OTHER PUBLICATIONS

Office Action dated Mar. 22, 2023 in corresponding Korean Application No. 10-2021-0057260 and English translation.

(Continued)

*Primary Examiner* — Pablo N Tran
(74) *Attorney, Agent, or Firm* — Knobbe, Martens, Olson & Bear, LLP

(57) ABSTRACT

This application relates to an apparatus and method for generating a jamming signal, and a communication system. In one aspect, the method may include converting binary bits of a first communication signal to be transmitted and obtaining at least one codeword matched previously to the binary bits. The method may also include generating a second communication signal by superimposing a first conversion signal being obtained by converting the first communication signal to an up-chirp signal and a second conversion signal being obtained by converting the first communication signal to a down-chirp signal. The method further include generating a pseudo jamming signal by computing the second communication signal and the codeword.

16 Claims, 9 Drawing Sheets

(56) References Cited

U.S. PATENT DOCUMENTS

| | | | |
|---|---|---|---|
| 11,728,840 B2 * | 8/2023 | Hall | H04L 27/265 |
| | | | 375/139 |
| 11,824,579 B2 * | 11/2023 | Hall | H04B 1/69 |
| 2020/0396010 A1 * | 12/2020 | Melodia | H04B 13/02 |
| 2023/0291615 A1 * | 9/2023 | Nikitin | H04L 25/03 |
| 2024/0250646 A1 * | 7/2024 | Ahmad | H03F 3/087 |

OTHER PUBLICATIONS

Office Action of corresponding Korean Patent Application No. 10-2021-0057260 (issued on Sep. 2, 2022).

Kim et al. "Comparative Performance Analysis of Single Linear Chirp Based Communication-Like Jamming Schemes in Chirp Spread Spectrum Systems", The Journal of Korean Institute of Communications and Information Sciences 21-04 vol. 46 No. 04 (Apr. 30, 2021) (English Abstract is included).

* cited by examiner

FIG. 7

TABLE 1
8-BOC M$_{\text{APPING}}$ (r = 3/4)

| Data symbol (Decimal) | Binary bit $\{b_1, b_2, b_3\}$ | Codeword $\{q_1, q_2, q_3, q_4\}$ |
|---|---|---|
| 0 | 000 | +1 +1 +1 +1 |
| 1 | 001 | +1 −1 +1 −1 |
| 2 | 010 | +1 +1 −1 −1 |
| 3 | 011 | +1 −1 −1 +1 |
| 4 | 100 | −1 −1 −1 −1 |
| 5 | 101 | −1 +1 −1 +1 |
| 6 | 110 | −1 −1 +1 +1 |
| 7 | 111 | −1 +1 +1 −1 |

APPARATUS AND METHOD FOR GENERATING JAMMING SIGNAL, COMMUNICATION SYSTEM

CROSS-REFERENCE TO RELATED APPLICATION

This application claims priority to Korean Patent Application No. 10-2021-0057260, filed on May 3, 2021. The entire contents of the application on which the priority is based are incorporated herein by reference.

TECHNICAL FIELD

The present disclosure relates to a method for generating a jamming signal using a communication signal, an apparatus for generating a jamming signal, and a communication system.

BACKGROUND

Currently, to detect, utilize, reduce, or interfere with enemy use of radio waves and to ensure friendly use of electromagnetic waves, methods for emitting radio frequency (RF) signals with high power have been used. Recently, research has been conducted on the methods for realizing efficient jamming attacks that check enemy communication information and reflect the characteristics of the checked communication signal.

SUMMARY

It is necessary to perform communication and jamming simultaneously with one communication signal to perform communication and jamming simultaneously. At this time, it is necessary to ensure the communication performance of friendly forces while degrading the communication performance of enemy forces.

A technical object to achieve according to an embodiment of the present disclosure includes using one signal to serve as a communication signal and a jamming signal simultaneously.

Also, another object includes separating friendly communication signals through the Independent Component Analysis (ICA) technique to ensure improvement of the communication performance of friendly forces.

Other technical objects not described explicitly in the present disclosure may be additionally considered within the technical scope easily inferred from the detailed descriptions below and the effects thereof.

In accordance with an aspect of the present disclosure, there is provided a method for generating a jamming signal performed by an apparatus for generating the jamming signal, the method comprising: obtaining at least one codeword matched previously to binary bits by converting the binary bits of a first communication signal to be transmitted to the at least one codeword; generating a second communication signal by superimposing a first conversion signal obtained being by converting the first communication signal to an up-chirp signal and a second conversion signal being obtained by converting the first communication signal to a down-chirp signal; and generating a pseudo jamming signal based on the second communication signal and the codeword.

Wherein the first communication signal includes a single linear chirp signal.

Wherein the second communication signal is divided into a first section and a second section based on the period of the first communication signal.

Wherein the first conversion signal includes a 1-1 conversion signal corresponding to the first section, and a 1-2 conversion signal corresponding to the second section is Wherein the second conversion signal includes a 2-1 conversion signal corresponding to the first section, and a 2-2 conversion signal corresponding to the second section.

Wherein the at least one codeword includes a first codeword and a second codeword, and the generating the pseudo jamming signal includes generating the pseudo jamming signal by multiplying the 1-1 conversion signal by the first codeword and multiplying the 1-2 conversion signal by the second codeword.

Wherein the at least one codeword includes first to fourth codewords, and the generating the pseudo jamming signal includes generating the pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

In accordance with another aspect of the present disclosure, there is provided an apparatus for generating a jamming signal, the apparatus comprising: a codeword converter configured to obtain at least one codeword matched previously to binary bits by converting the binary bits of a first communication signal to be transmitted to the at least one codeword; a signal superimposing unit configured to generate a second communication signal by superimposing a first conversion signal being obtained by converting the first communication signal to an up-chirp signal and a second conversion signal being obtained by converting the first communication signal to a down-chirp signal; and a jamming signal generator configured to generate a pseudo jamming signal based on the second communication signal and the at least one codeword.

Wherein the at least one codeword converter is configured to convert N (where N is a natural number greater than or equal to 3) binary bits into the at least one codeword using a Binary Orthogonal Code (BOC) encoder.

Wherein the first communication signal includes a single linear chirp signal.

Wherein the second communication signal is divided into a first section and a second section based on the period of the first communication signal, and wherein the first conversion signal includes a 1-1 conversion signal corresponding to the first section, and a 1-2 conversion signal corresponding to the second section.

Wherein the second conversion signal includes a 2-1 conversion signal corresponding to the first section, and a 2-2 conversion signal corresponding to the second section.

Wherein the at least one codeword includes a first to codeword and a second codeword, and wherein the jamming signal generator is configured to generate the pseudo jamming signal by multiplying the 1-1 conversion signal by the first codeword and multiplying the 1-2 conversion signal by the second codeword.

Wherein the at least one codeword includes first to fourth codewords, and wherein the jamming signal generator is configured to generate the pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

In accordance with another aspect of the present disclosure, there is provided a communication system, the communication system comprising: a receiver configured to separate a first communication signal from a received mixed signal using Independent Component Analysis (ICA); and a jamming signal generator configured to generate a pseudo jamming signal based on a second communication signal and at least one codeword generated based on the first communication signal.

In accordance with another aspect of the present disclosure, there is provided a non-transitory computer-readable storage medium including computer executable instructions, wherein the instructions, when executed by a processor, cause the processor to perform a method for generating a jamming signal, the method comprising: obtaining at least one codeword matched previously to binary bits by converting the binary bits of a first communication signal to be transmitted to the at least one codeword; generating a second communication signal by superimposing a first conversion signal being obtained by converting the first communication signal to an up-chirp signal and a second conversion signal being obtained by converting the first communication signal to a down-chirp signal; and generating a pseudo jamming signal based on the second communication signal and the at least one codeword.

In accordance with another aspect of the present disclosure, there is provided a computer program stored in a non-transitory computer-readable storage medium including computer executable instructions, wherein the instructions, when executed by a processor, cause the processor to perform a method for generating a jamming signal, the method comprising: obtaining at least one codeword matched previously to binary bits by converting the binary bits of a first communication signal to be transmitted to the at least one codeword; generating a second communication signal by superimposing a first conversion signal being obtained by converting the first communication signal to an up-chirp signal and a second conversion signal being obtained by converting the first communication signal to a down-chirp signal; and generating a pseudo jamming signal based on the second communication signal and the at least one codeword.

As described above, according to the embodiments of the present disclosure, a single signal may serve as a communication signal and a jamming signal simultaneously.

Also, according to the present disclosure, by configuring a communication signal to be transmitted through a coding scheme, it is possible to degrade the communication performance of enemy forces and improve the communication performance of friendly forces.

Also, it is possible to create a synergistic effect that may significantly improve the communication performance of the friendly forces by separating friendly communication signals from the receiver of the friendly forces through independent component analysis.

Accordingly, the effect of reducing power consumption is achieved in the communication-like jamming technique.

For those effects not explicitly mentioned herein, the effects expected by the technical features of the present disclosure and their potential effects are treated as if the effects were described in the present disclosure.

BRIEF DESCRIPTION OF THE DRAWINGS

FIG. 7 shows a table illustrating BOC mapping due to the coding technique used for a method for generating a jamming signal according to one embodiment of the present disclosure.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

A term such as "module", "unit" or the like disclosed in the specification may include its ordinary meaning including, but not limited to, for example, a unit of one, or a combination of two or more, hardware, software or firmware. The term such as "module", "unit" or the like may be used interchangeably with a term such as unit, logic, logical block, component, or circuit. A module may be the smallest unit for performing one or more functions, or a portion thereof. A module may be implemented mechanically or electronically. For example, The term such as "module", "unit" or the like according to the present disclosure may include at least one of a known or to-be-developed application-specific integrated circuit (ASIC), field-programmable gate array (FPGA) or programmable logic device that perform certain operations.

One embodiment of the present disclosure relates to a method and an apparatus for generating a jamming signal and a communication system.

Figure 1:
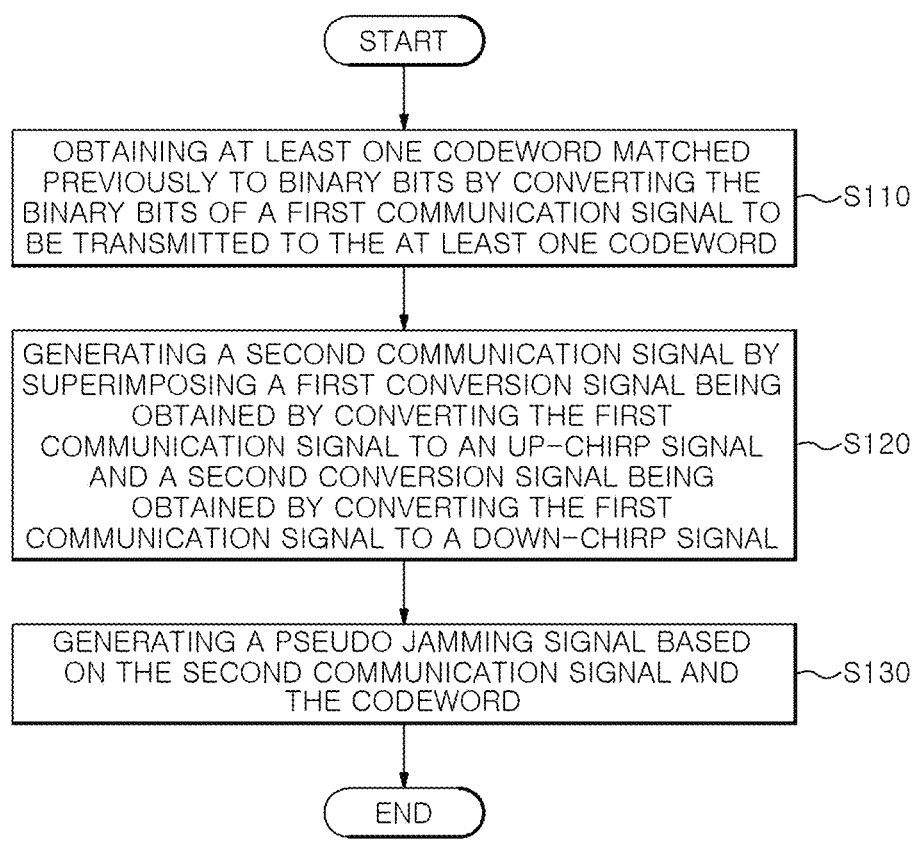
FIG. 1 is a flow diagram illustrating a method for generating a jamming signal according to one embodiment of the present disclosure.

FIG. 1 is a flow diagram illustrating a method for generating a jamming signal according to one embodiment of the present disclosure.

Referring to FIG. 1, a method for generating a jamming signal according to one embodiment of the present disclosure may be performed by an apparatus for generating a jamming signal. Also, a method for generating a jamming signal according to one embodiment of the present disclosure may convert binary bits of a first communication signal to be transmitted and obtain at least one codeword matched previously to the binary bits.

According to one embodiment of the present disclosure, the first communication signal may refer to a communication signal of friendly forces and may be a single linear chirp signal.

Here, in the step of obtaining a codeword S110, the apparatus for generating a jamming signal converts N binary bits (where N is a natural number greater than or equal to 3) to at least one codeword. The codeword conversion operation will be described in detail with reference to FIG. 7.

Then, in the S120 step, the apparatus for generating a jamming signal generates a second communication signal by superimposing a first conversion signal obtained by converting the first communication signal to an up-chirp signal and a second conversion signal obtained by converting the first communication signal to a down-chirp signal.

Here, the second communication signal may be divided into a first section and a second section based on the period of the first communication signal. A portion of the first conversion signal corresponding to the first section may be denoted as a 1-1 conversion signal, and a portion of the first conversion signal corresponding to the second section may be denoted as a 1-2 conversion signal.

Also, a portion of the second conversion signal corresponding to the first section is denoted as a 2-1 conversion signal, and a portion of the second conversion signal corresponding to the second section is denoted as a 2-2 conversion signal.

In the S130 step, the apparatus for generating a jamming signal generates a pseudo jamming signal by computing the second communication signal and the codeword.

Specifically, the codeword may include first to fourth codewords. In the S130 step of generating a pseudo jamming signal by computing the second communication signal and the codeword, the apparatus for generating a jamming signal generates a pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

A chirp signal based on S120 to S130 steps will be described in detail with reference to FIGS. 8 to 10.

Figure 2:
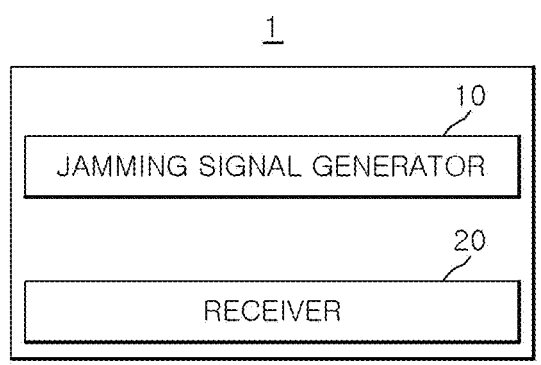
FIG. 2 is a block diagram illustrating a communication system according to one embodiment of the present disclosure.

FIG. 2 is a block diagram illustrating a communication system according to one embodiment of the present disclosure.

Referring to FIG. 2, the communication system 1 according to one embodiment of the present disclosure includes an apparatus for generating a jamming signal 10 and a receiver 20.

The apparatus for generating a jamming signal 10 generates a pseudo jamming signal by computing a second communication signal and a codeword generated based on a first communication signal.

The receiver 20 separates the first communication signal from a received mixed signal through the Independent Component Analysis (ICA).

Here, the mixed signal refers to a signal in which a friendly communication signal, an enemy communication signal, and an enemy jamming signal are mixed, and the first communication signal refers to the communication signal of friendly forces.

Specifically, due to the nature of the communication-like jamming technique, there is a limit to guaranteeing the communication performance of friendly forces by improving the spectral efficiency through a coding scheme when a communication signal of friendly forces, an enemy communication signal, and an enemy jamming signal enter the receiver of friendly forces. In this regard, the present disclosure intends to guarantee improvement of the communication performance of friendly forces by separating the friendly communication signal through the Independent Component Analysis (ICA).

Independent component analysis (ICA) is a computational method that separates a multivariate signal into statistically independent subcomponents. Each component is a non-Gaussian signal and consists of components statistically independent from each other, by which blind signals may be separated.

According to one embodiment of the present disclosure, the independent component analysis technique is implemented on the receiver side and may be implemented separately from the anti-jamming signal transmission. Since the center frequencies of the friendly signal and the enemy signal coincide, the friendly communication signal may be separated using independent component analysis.

Figure 3:
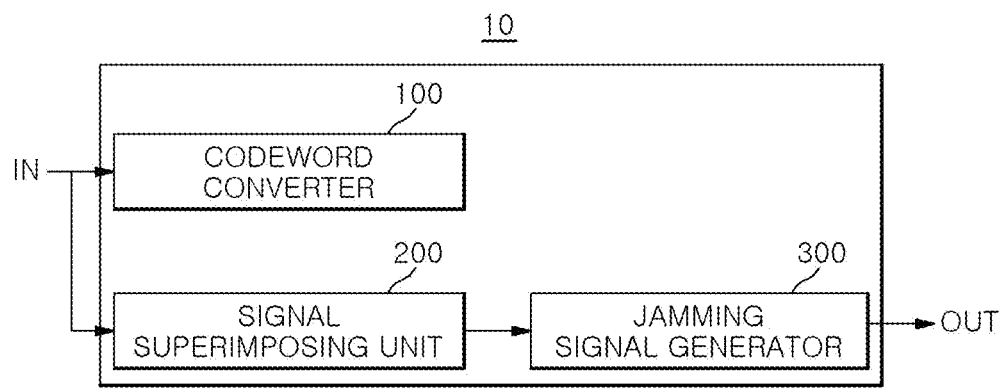
FIG. 3 is a block diagram illustrating an apparatus for generating a jamming signal according to one embodiment of the present disclosure.

FIG. 3 is a block diagram illustrating an apparatus for generating a jamming signal according to one embodiment of the present disclosure.

Referring to FIG. 3, the apparatus for generating a jamming signal 10 according to one embodiment of the present disclosure includes a codeword converter 100, a signal superimposing unit 200, and a jamming signal generator 300.

The apparatus for generating a jamming signal 10 according to one embodiment of the present disclosure uses one signal as a communication signal and a jamming signal simultaneously without implementing the communication and jamming signals separately.

For example, in one embodiment of the present disclosure, one signal may use a communication signal of friendly forces, and the apparatus for generating a jamming signal 10 may generate a pseudo jamming signal using a first communication signal which is a communication signal of friendly forces.

To this end, it is assumed that the friendly forces are targeting effective jamming based on the assumption that the friendly forces know the information of enemy communication signals, namely, the center frequency, the bandwidth, and the modulation and demodulation methods of the enemy communication signal.

The codeword converter 100 converts binary bits of the first communication signal to be transmitted and obtains at least one codeword matched previously to the binary bits.

According to one embodiment of the present disclosure, the first communication signal refers to a friendly communication signal and may be a single linear chirp signal.

Also, the enemy communication signal may be a single linear chirp signal.

Here, in the S110 step of obtaining a codeword, N (where N is a natural number greater than or equal to 3) binary bits may be converted to at least one codeword using a Binary Orthogonal Code (BOC) encoder, and detailed operations for conversion will be described in detail with reference to FIG. 7.

The signal superimposing unit 200 generates a second communication signal by superimposing a first conversion signal obtained by converting the first communication signal to an up-chirp signal and a second conversion signal obtained by converting the first communication signal to a down-chirp signal.

Here, the second communication signal may be divided into a first section and a second section based on the period of the first communication signal. A portion of the first conversion signal corresponding to the first section is denoted as a 1-1 conversion signal, and a portion of the first conversion signal corresponding to the second section is denoted as a 1-2 conversion signal.

Also, a portion of the second conversion signal corresponding to the first section is denoted as a 2-1 conversion signal, and a portion of the second conversion signal corresponding to the second section is denoted as a 2-2 conversion signal.

Here, the period of the first communication signal means one chirp duration of a single linear chirp signal.

In other words, the duration of one chirp may be equally divided into two halves, a front chirp and a rear chirp, which may be denoted as a first region and a second region, respectively. Although it is assumed that the duration of one chirp is equally divided into two halves according to one embodiment of the present disclosure, the present disclosure is not limited thereto.

The jamming signal generator 300 generates a pseudo jamming signal by computing the second communication signal and the codeword.

Specifically, the codeword may include first to fourth codewords. The jamming signal generator 300 generates a pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

In other words, when the signal superimposing unit 200 superimposes two chirp signals consisting of up and down chirp signals within one chirp duration of a single linear chirp signal and sends the superimposed chirp signals at the same time, the jamming signal generator 300 may generate a coded pseudo jamming signal through a coded linear chirp technique. For example, to generate the coded pseudo jamming signal using the coded linear chirp technique, the jamming signal generator 300 generates a coded pseudo jamming signal by dividing one chirp duration in half and dividing the superimposed chirp signal into two chirps consisting of front and rear chirps and multiplying the two chirps by a total of four codewords.

Figure 4:
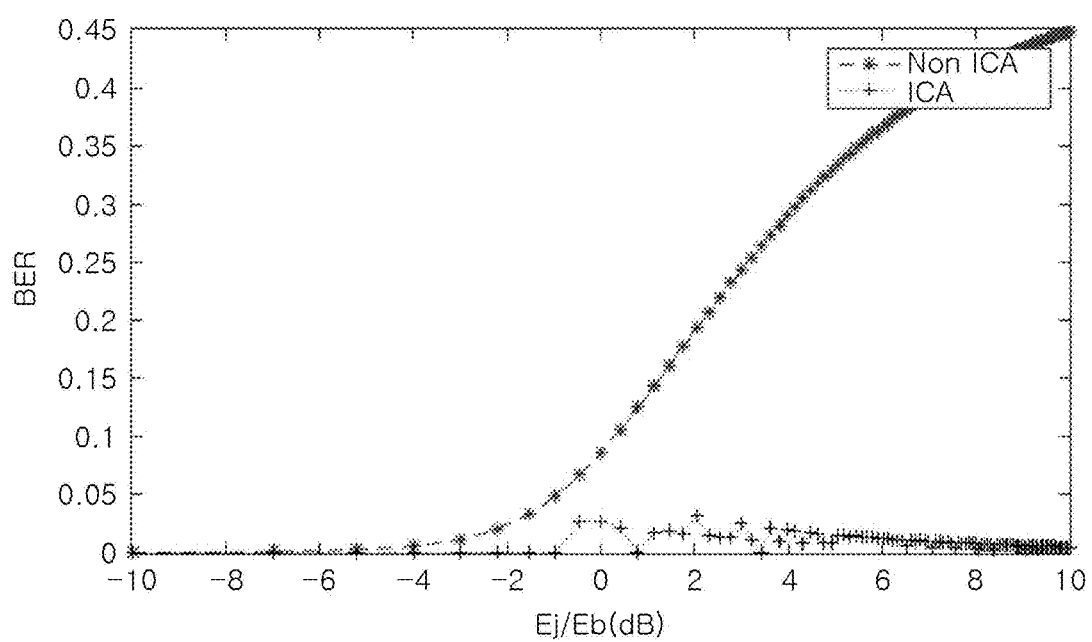
FIG. 4 illustrates the BER of a receiver of friendly forces due to a relative intensity increase of an enemy signal through ICA technique.

FIG. 4 illustrates the BER of a receiver of friendly forces due to a relative intensity increase of an enemy signal through ICA technique.

FIG. 4 is a graph showing measurements of the communication performance, bit error rate (BER) obtained by separating a friendly communication signal from a received mixed signal when a receiver of friendly forces picks up an enemy communication signal, an enemy jamming signal, and a communication signal of friendly forces.

FIG. 4 shows that the communication performance of the friendly forces may be guaranteed even if the strength of the enemy communication signal power increases.

Figure 5:
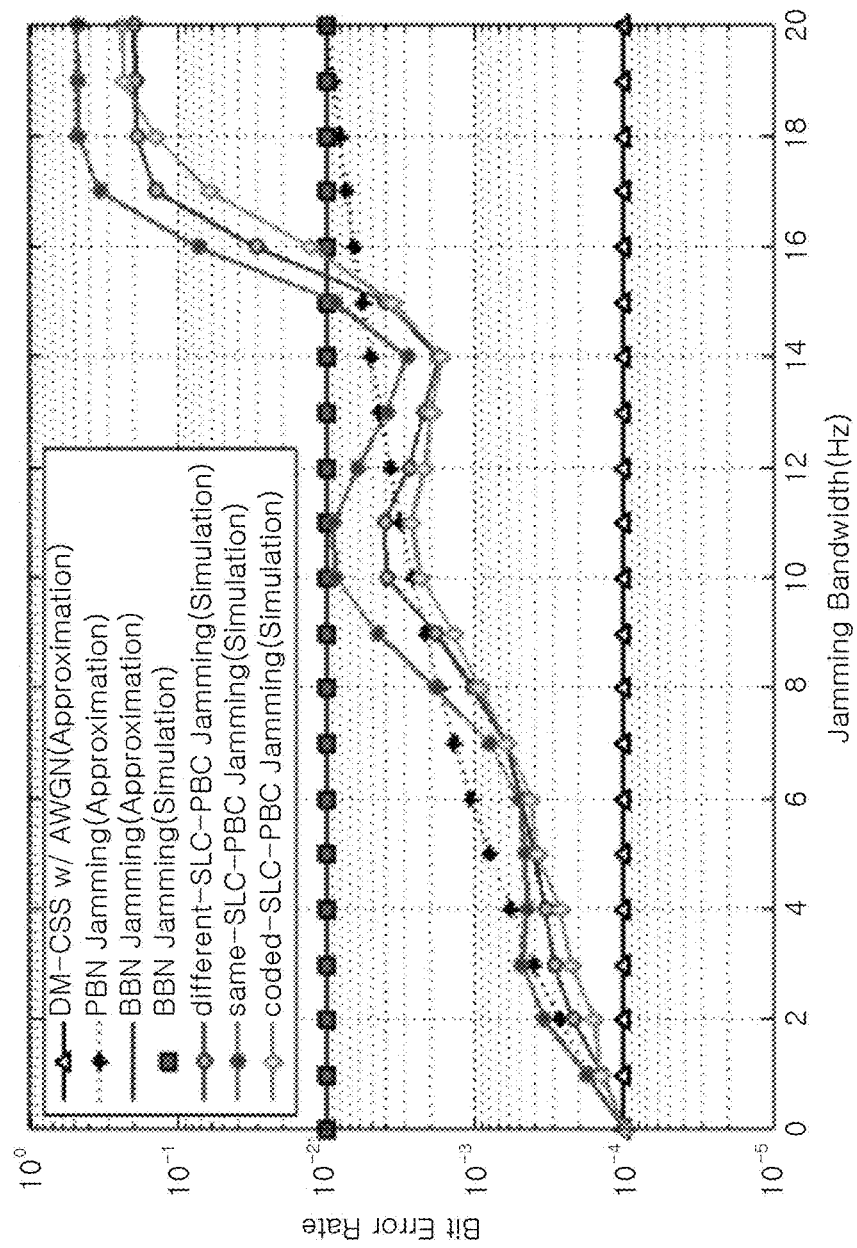
FIG. 5 illustrates the enemy BER to which various CU techniques due to the bandwidth for friendly forces have been applied.

FIG. 5 illustrates the enemy BER to which various CU techniques due to the bandwidth for friendly forces have been applied.

FIG. 5 is a graph showing the degradation of enemy communication performance in terms of BER as the bandwidth of a pseudo jamming signal of friendly forces is adjusted based on a single linear chirp scheme in which an enemy communication signal is assumed to be a single linear chirp signal composed only of up-chirp signals, and a pseudo jamming signal of friendly forces is composed of the same up-chirp signals; a superimposed single linear chirp scheme in which up-chirp signals and down-chirp signals are superimposed; and a coded single linear chirp scheme in which four codewords are transmitted to up-chirp, down-chirp, front chirp, and rear chirp signals through the BOC encoder.

Accordingly, in the case of a coded single linear chirp scheme in which four codewords are transmitted to up-chirp, down-chirp, front chirp, and rear chirp signals through the BOC encoder according to an embodiment of the present disclosure, it may be confirmed that the bit error rate (BER) is decreased.

Figure 6:
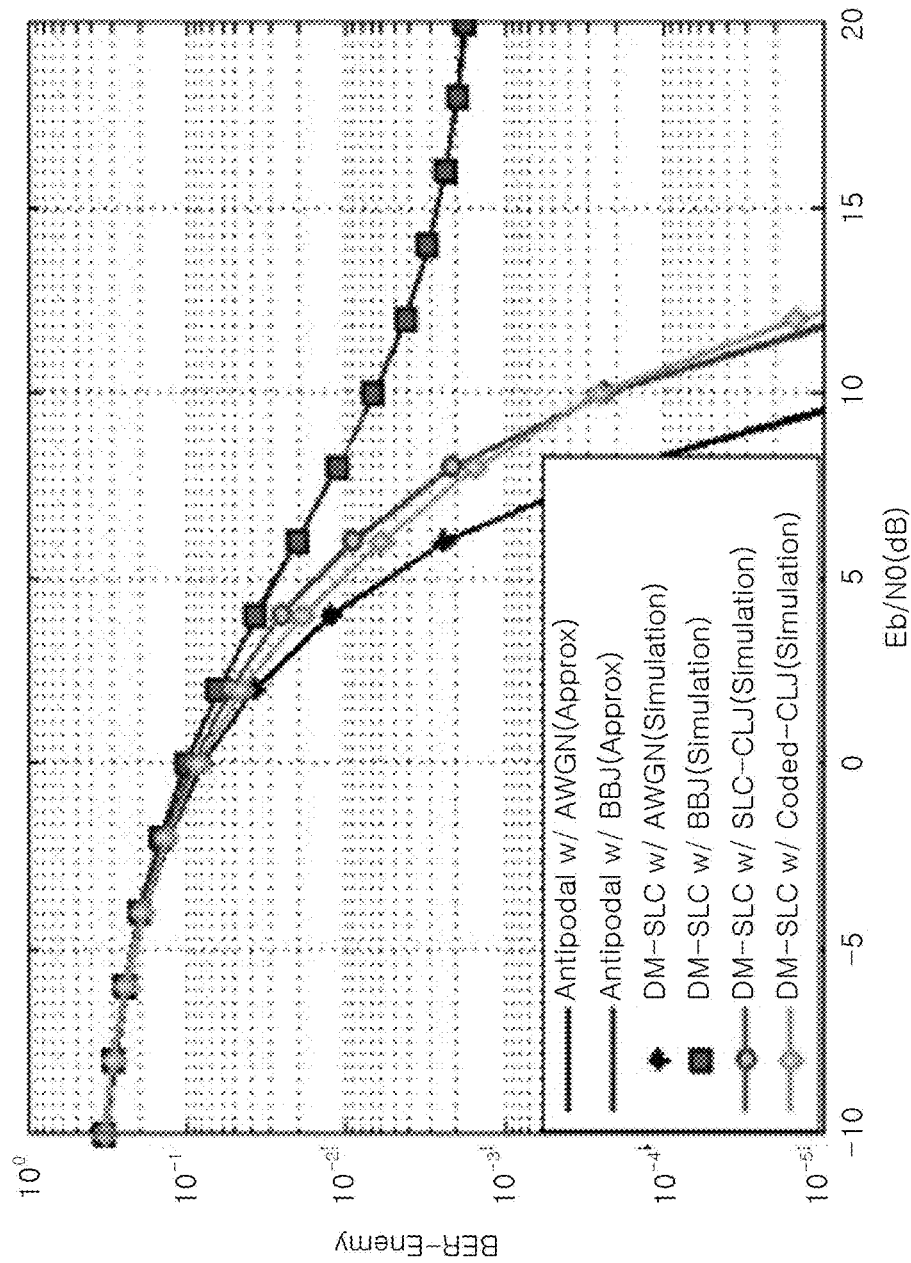
FIG. 6 illustrates enemy BER performance due to Eb/NO of an enemy communication signal.

FIG. 6 illustrates enemy BER performance due to Eb/NO of an enemy communication signal.

FIG. 6 shows that there is no significant difference in the degradation of the enemy communication performance between the cases where the coding technique is applied and not applied to the communication-like jamming scheme of friendly forces based on the power level, but improving the spectrum efficiency may guarantee the communication performance of the friendly forces.

FIG. 7 shows a table illustrating BOC mapping due to the coding technique used for a method for generating a jamming signal according to one embodiment of the present disclosure.

Specifically, FIG. 7 shows a table replacing three binary bits with four codewords.

In the method for generating a jamming signal according to one embodiment of the present disclosure, the apparatus for generating a jamming signal converts binary bits of a first communication signal to be transmitted and obtains at least one codeword matched previously to the binary bits.

The table, which illustrates BOC mapping, includes data symbols 110, binary bits 120, and codewords 130.

As the table shows, the binary bits 120 are mapped one-to-one to the codeword 130 so that the eight data symbols 110 from 000 to 111 do not overlap.

The method for generating a jamming signal according to one embodiment of the present disclosure may transmit three binary bits instead of transmitting one or two binary bits within one chirp duration as in the existing single linear chirp scheme or superimposed single linear chirp scheme. Also, four or more binary bits may be transmitted depending on the situations in which the embodiment may be implemented.

For example, $q_1$, $q_2$, $q_3$, and $q_4$ are first, second, third, and fourth codewords, respectively. The jamming signal generator 300 generates a pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

Figure 8:
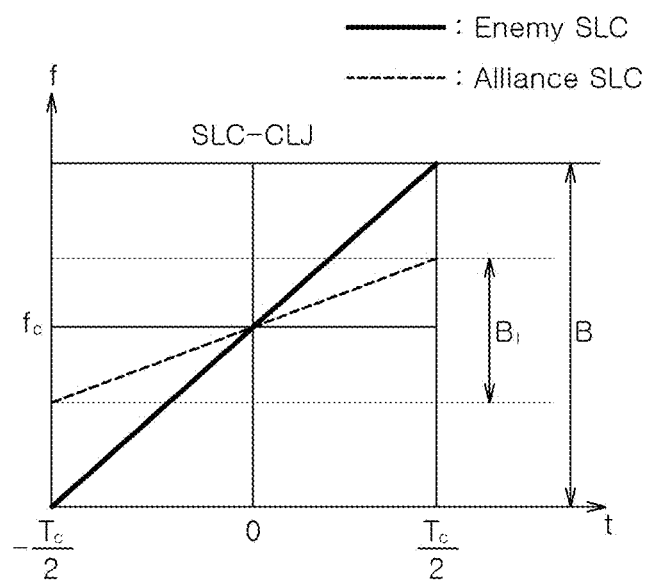
FIG. 8 shows a chirp signal based on a single linear chirp technique used for a method for generating a jamming signal according to one embodiment of the present disclosure.

FIG. 8 shows a chirp signal based on a single linear chirp technique used for a method for generating a jamming signal according to one embodiment of the present disclosure.

Referring to FIG. 8, a first communication signal according to one embodiment of the present disclosure means a friendly communication signal, which may be a single linear chirp signal while an enemy communication signal may also be a single linear chirp signal.

In FIG. 8, $b_1$ represents the bandwidth of a friendly signal, B represents the bandwidth of an enemy signal, $f_c$ is the center frequency, and the friendly communication signal and the enemy communication signal have the same center frequency $f_c$.

Also, the period of the friendly communication signal and the period of the enemy communication signal are $T_c$.

Figure 9:
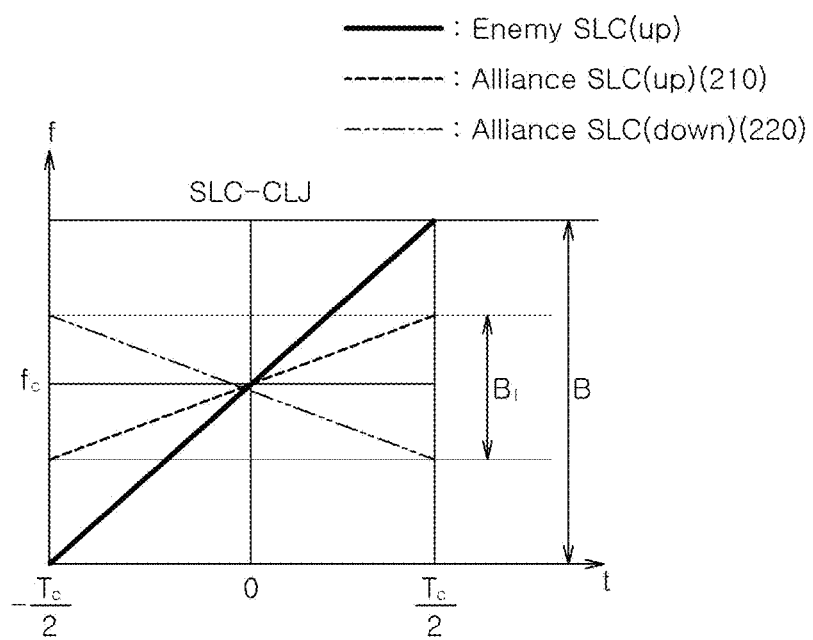
FIG. 9 shows a chirp signal based on a superimposed single linear chirp technique used for a method for generating a jamming signal according to one embodiment of the present disclosure.

FIG. 9 shows a chirp signal based on a superimposed single linear chirp technique used for a method for generating a jamming signal according to one embodiment of the present disclosure.

The signal superimposing unit 200 generates a second communication signal by superimposing a first conversion signal 210 obtained by converting the first communication signal to an up-chirp signal and a second conversion signal 220 obtained by converting the first communication signal to a down-chirp signal.

In FIG. 9, $b_1$ represents the bandwidth of the first conversion signal 210 and the second conversion signal 220, B represents the bandwidth of an enemy signal, $f_c$ is the center frequency, and the friendly communication signal and the enemy communication signal have the same center frequency $f_c$. Also, the period of the friendly communication signal and the period of the enemy communication signal are $T_c$.

Figure 10:
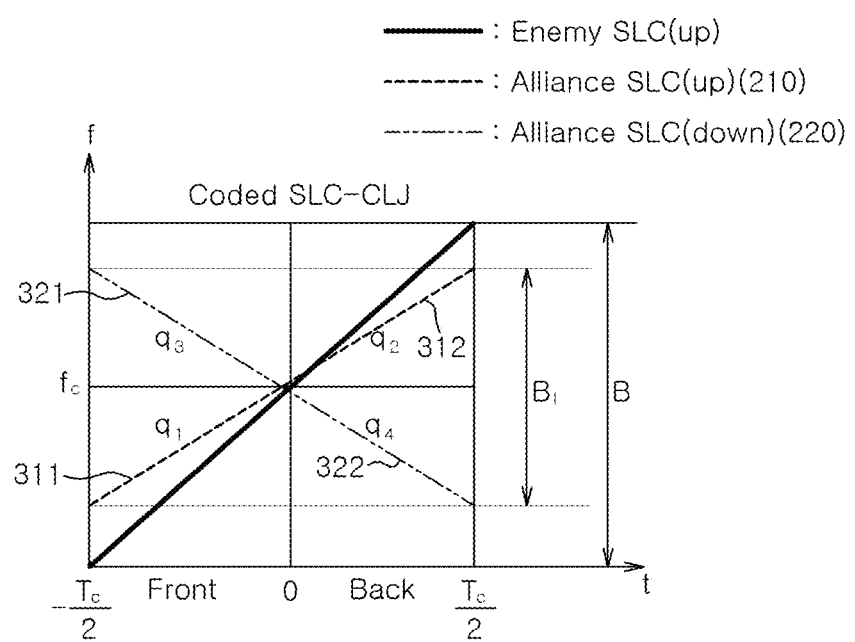
FIG. 10 shows a chirp signal applying coding technique to a single linear chirp technique, which is used for a method for generating a jamming signal according to one embodiment of the present disclosure.

FIG. 10 shows a chirp signal applying coding technique to a single linear chirp technique, which is used for a method for generating a jamming signal according to one embodiment of the present disclosure.

The second communication signal may be divided into a first section and a second section based on the period of the first communication signal. A portion of the first conversion signal corresponding to the first section is denoted as a 1-1 conversion signal, and a portion of the first conversion signal corresponding to the second section is denoted as a 1-2 conversion signal. Also, a portion of the second conversion signal corresponding to the first section is denoted as a 2-1 conversion signal, and a portion of the second conversion signal corresponding to the second section is denoted as a 2-2 conversion signal.

Here, the period of the first communication signal means one chirp duration of a single linear chirp signal.

Afterward, the jamming signal generator 300 generates a pseudo jamming signal by computing the second communication signal and the codeword.

Specifically, as shown in FIG. 10, the codeword includes first to fourth codewords $q_1$, $q_2$, $q_3$, and $q_4$, and the jamming signal generator 300 generates a pseudo jamming signal by multiplying the 1-1 conversion signal 311 by the first codeword $q_1$, multiplying the 1-2 conversion signal 312 by the second codeword $q_2$, multiplying the 2-1 conversion signal 321 by the third codeword $q_3$, and multiplying the 2-2 conversion signal 322 by the fourth codeword $q_4$.

In other words, when the signal superimposing unit 200 superimposes two chirp signals consisting of up and down chirp signals within one chirp duration of a single linear chirp signal and sends the superimposed chirp signals at the same time, the jamming signal generator 300 may generate a coded pseudo jamming signal through a coded linear chirp technique which may transmit the superimposed chirp signals by dividing one chirp duration in half, dividing the superimposed chirp signal into two chirps consisting of front and rear chirps, and multiplying the two chirps by a total of four codewords.

In FIG. 10, $b_1$ represents the bandwidth of a pseudo jamming signal, B represents the bandwidth of an enemy signal, $f_c$ is the center frequency, and the friendly communication signal and the enemy communication signal have the same center frequency $f_c$. Also, the period of the friendly communication signal and the period of the enemy communication signal are $T_c$.

A communication signal according to one embodiment of the present disclosure may be implemented by Eq. 1.

$$c_i(t) = A_i \cdot \cos(2\pi f_c t + \pi \mu t^2), |t| \leq \frac{T_c}{2}, \quad [\text{Eq. 1}]$$

$$c_{i,k}(t) = A_i \cdot \cos(2\pi f_c t - (-1)^k \pi \mu t^2)$$

In Eq. 1, $c_i(t)$ represents a first communication signal, and $c_{i,k}(t)$ represents a second communication signal.

Based on Eq. 1, a pseudo jamming signal generated according to one embodiment of the present disclosure may be implemented using Eq. 2.

$$c_{1,f}(t_f) = q_1 \cdot \sqrt{2E_b/T_c} \cdot \cos(2\pi f_c t_f + \pi \mu t_f^2)$$

$$c_{1,b}(t_b) = q_2 \cdot \sqrt{2E_b/T_c} \cdot \cos(2\pi f_c t_b + \pi \mu t_b^2)$$

$$c_{0,f}(t_f) = q_3 \cdot \sqrt{2E_b/T_c} \cdot \cos(2\pi f_c t_f - \pi \mu t_f^2)$$

$$c_{0,b}(t_b) = q_4 \cdot \sqrt{2E_b/T_c} \cdot \cos(2\pi f_c t_b - \pi \mu t_b^2) \quad [\text{Eq. 2}]$$

In Eq. 2, $q_1$, $q_2$, $q_3$, and $q_4$ represent the first to fourth codeword, $c_{1,f}(t_f)$ represents a signal obtained by multiplying the 1-1 conversion signal 311 by the first codeword $q_1$, $c_{1,b}(t_b)$ represents a signal obtained by multiplying the 1-2 conversion signal 312 by the second codeword $q_2$, $c_{0,f}(t_f)$ represents a signal obtained by multiplying the 2-1 conversion signal 321 by the third codeword $q_3$, and $c_{0,b}(t_b)$ represents a signal obtained by multiplying the 2-2 conversion signal 322 by the fourth codeword $q_4$.

According to one embodiment of the present disclosure, spectral efficiency may be improved since a plurality of communication binary bits may be transmitted within one communication signal duration.

This is because the present disclosure transmits more bits for the same period, which may directly lead to improved communication performance. Due to the nature of the communication-like jamming technique, by generating a signal similar to the enemy communication signal and performing jamming and communication at the same center frequency using similar bandwidth, the enemy communication performance may be degraded, and the communication performance of friendly forces may be improved through a coding technique. However, since the performance improvement may not be enough to guarantee the communication performance of the friendly forces, the communication performance of the friendly forces may be further improved by separating a mixed signal from a friendly receiver into the original signal, that is, the friendly communication signal through independent component analysis. Furthermore, it is possible to guarantee the communication performance of the friendly forces reliably. This is an important feature considering the characteristics of a communication-like jamming technique that performs communication and jamming simultaneously, through which the communication performance of the friendly forces may be guaranteed, and one signal may serve as a jamming signal and a communication signal to gain an advantageous effect of reducing power consumption.

In accordance with another aspect of the present disclosure, there is provided a non-transitory computer-readable storage medium including computer executable instructions, wherein the instructions, when executed by a processor, cause the processor to perform a transfer method, the method comprising: obtaining at least one codeword matched previously to binary bits by converting the binary bits of a first communication signal to be transmitted to the at least one codeword; generating a second communication signal by superimposing a first conversion signal obtained by converting the first communication signal to an up-chirp signal and a second conversion signal obtained by converting the first communication signal to a down-chirp signal; and generating a pseudo jamming signal based on the second communication signal and the at least one codeword.

In accordance with another aspect of the present disclosure, there is provided a computer program stored in a non-transitory computer-readable storage medium including computer executable instructions, wherein the instructions, when executed by a processor, cause the processor to perform a transfer method, the method comprising: obtaining at least one codeword matched previously to binary bits by converting the binary bits of a first communication signal to be transmitted to the at least one codeword; generating a second communication signal by superimposing a first conversion signal obtained by converting the first communication signal to an up-chirp signal and a second conversion signal obtained by converting the first communication signal to a down-chirp signal; and generating a pseudo jamming signal based on the second communication signal and the at least one codeword.

The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa.

The above description is merely exemplary description of the technical scope of the present disclosure, and it will be understood by those skilled in the art that various changes and modifications can be made without departing from original characteristics of the present disclosure. The protection scope of the present disclosure should be interpreted based on the following claims and it should be appreciated that all technical scopes included within a range equivalent thereto are included in the protection scope of the present disclosure.

What is claimed is:

1. A method for generating a jamming signal performed by an apparatus for generating the jamming signal, the method comprising:
   obtaining at least one codeword matched previously to binary bits by converting the binary bits of a first communication signal to be transmitted to the at least one codeword;
   generating a second communication signal by superimposing a first conversion signal being obtained by converting the first communication signal to an up-chirp signal and a second conversion signal being obtained by converting the first communication signal to a down-chirp signal; and
   generating a pseudo jamming signal based on the second communication signal and the codeword.

2. The method of claim 1, wherein the obtaining the at least one codeword includes converting N (where N is a natural number greater than or equal to 3) binary bits into the at least one codeword using a binary orthogonal code (BOC) encoder.

3. The method of claim 1, wherein the first communication signal includes a single linear chirp signal.

4. The method of claim 1, wherein the second communication signal is divided into a first section and a second section based on the period of the first communication signal, and
   wherein the first conversion signal includes a 1-1 conversion signal corresponding to the first section, and a 1-2 conversion signal corresponding to the second section.

5. The method of claim 4, wherein the second conversion signal includes a 2-1 conversion signal corresponding to the first section, and a 2-2 conversion signal corresponding to the second section.

6. The method of claim 5, wherein the at least one codeword includes first to fourth codewords, and
   wherein the generating the pseudo jamming signal includes generating the pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

7. The method of claim 4, wherein the at least one codeword includes a first codeword and a second codeword, and
   wherein the generating the pseudo jamming signal includes generating the pseudo jamming signal by multiplying the 1-1 conversion signal by the first codeword and multiplying the 1-2 conversion signal by the second codeword.

8. An apparatus for generating a jamming signal, the apparatus comprising:
   a codeword converter configured to obtain at least one codeword matched previously to binary bits by converting the binary bits of a first communication signal to be transmitted to the at least one codeword;
   a signal superimposing unit configured to generate a second communication signal by superimposing a first conversion signal obtained by converting the first communication signal to an up-chirp signal and a second conversion signal obtained by converting the first communication signal to a down-chirp signal; and a jamming signal generator configured to generate a pseudo jamming signal based on the second communication signal and the at least one codeword.

9. The apparatus of claim 8, wherein the at least one codeword converter is configured to convert N (where N is a natural number greater than or equal to 3) binary bits into the at least one codeword using a binary orthogonal code (BOC) encoder.

10. The apparatus of claim 8, wherein the first communication signal includes a single linear chirp signal.

11. The apparatus of claim 8, wherein the second communication signal is divided into a first section and a second section based on the period of the first communication signal, and wherein the first conversion signal includes a 1-1 conversion signal corresponding to the first section, and a 1-2 conversion signal corresponding to the second section.

12. The apparatus of claim 11, wherein the second conversion signal includes a 2-1 conversion signal corresponding to the first section, and a 2-2 conversion signal corresponding to the second section.

13. The apparatus of claim 12, wherein the at least one codeword includes first to fourth codewords, and
wherein the jamming signal generator is configured to generate the pseudo jamming signal by multiplying the 1-1 conversion signal by the first codeword, multiplying the 1-2 conversion signal by the second codeword, multiplying the 2-1 conversion signal by the third codeword, and multiplying the 2-2 conversion signal by the fourth codeword.

14. The apparatus of claim 11, wherein the at least one codeword includes a first to codeword and a second codeword, and
wherein the jamming signal generator is configured to generate the pseudo jamming signal by multiplying the 1-1 conversion signal by the first codeword and multiplying the 1-2 conversion signal by the second codeword.

15. A communication system comprising the apparatus of claim 8, wherein the system further comprises:
a receiver configured to separate the first communication signal from a received mixed signal using independent component analysis (ICA).

16. A non-transitory computer-readable storage medium including computer executable instructions, wherein the instructions, when executed by a processor, cause the processor to perform a method for generating a jamming signal, the method comprising:
obtaining at least one codeword matched previously to binary bits by converting the binary bits of a first communication signal to be transmitted to the at least one codeword;
generating a second communication signal by superimposing a first conversion signal obtained by converting the first communication signal to an up-chirp signal and a second conversion signal obtained by converting the first communication signal to a down-chirp signal; and
generating a pseudo jamming signal based on the second communication signal and the at least one codeword.

* * * * *